United States Patent
Wu et al.

(10) Patent No.: US 11,328,225 B1
(45) Date of Patent: May 10, 2022

(54) AUTOMATIC SPATIAL REGRESSION SYSTEM

(71) Applicant: SAS Institute Inc., Cary, NC (US)

(72) Inventors: Guohui Wu, Cary, NC (US); Jan Chvosta, Raleigh, NC (US); Wan Xu, Cary, NC (US); Gunce Eryuruk Walton, Raleigh, NC (US); Xilong Chen, Chapel Hill, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/524,406

(22) Filed: Nov. 11, 2021

Related U.S. Application Data (60) Provisional application No. 63/223,062, filed on Jul. 18, 2021, provisional application No. 63/185,750, filed on May 7, 2021.

(51) Int. Cl.
*G06N 20/00* (2019.01)
*G06F 17/16* (2006.01)

(52) U.S. Cl.
CPC ............. *G06N 20/00* (2019.01); *G06F 17/16* (2013.01)

(58) Field of Classification Search
None
See application file for complete search history.

(56) References Cited

U.S. PATENT DOCUMENTS

2020/0311574 A1* 10/2020 Andrade Silva ....... G06N 20/00

OTHER PUBLICATIONS

SAS Econometrics: Econometrics Procedures, SAS Documentation Apr. 21, 2021, Copyright 2021, SAS Institute Inc. 79 pages.
SAS Econometrics 8.4 Econometrics Procedures, Copyright 2019, SAS Institute Inc.
Corrado et al., Where is the Economics in Spatial Econometrics?*, *Journal of Regional Science*, vol. 00, No. 0, 2011, pp. 1-30.

* cited by examiner

*Primary Examiner* — David R Vincent
(74) *Attorney, Agent, or Firm* — Bell & Manning, LLC (57) ABSTRACT

A computing device selects a trained spatial regression model. A spatial weights matrix defined for observation vectors is selected, where each element of the spatial weights matrix indicates an amount of influence between respective pairs of observation vectors. Each observation vector is spatially referenced. A spatial regression model is selected from spatial regression models, initialized, and trained using the observation vectors and the spatial weights matrix to fit a response variable using regressor variables. Each observation vector includes a response value for the response variable and a regressor value for each regressor variable of the regressor variables. A fit criterion value is computed for the spatial regression model and the spatial regression model selection, initialization, and training are repeated until each spatial regression model is selected. A best spatial regression model is selected and output as the spatial regression model having an extremum value of the fit criterion value.

30 Claims, 6 Drawing Sheets

AUTOMATIC SPATIAL REGRESSION SYSTEM

CROSS-REFERENCE TO RELATED APPLICATIONS

The present application claims the benefit of and priority under 35 U.S.C. § 119(e) to U.S. Provisional Patent Application No. 63/185,750 filed on May 7, 2021 and to U.S. Provisional Patent Application No. 63/223,062 filed on Jul. 18, 2021, the entire contents of which are hereby incorporated by reference.

BACKGROUND

Spatial regression models are widely used to analyze spatial data where spatial dependence is an important factor in the analysis. As in most other machine learning analyses, at the beginning of an analysis process, the most accurate model that can be generated from data is unknown in terms of the type of model as well as the hyperparameters selected to train each type of model. In addition to model uncertainty, spatial regression models also rely on a spatial weights matrix to parametrize various form of spatial dependence, which creates another layer of uncertainty. The spatial weights matrix describes neighbor relationships between spatial units (e.g., points or locations in space) associated with each observation vector in the spatial data. When an inaccurate model is used for analysis, inconsistent parameter estimates and flawed inferences may result leading to poor decision-making. When an inaccurate spatial weights matrix is used for analysis, the actual neighbor relationships between spatial units in the data are not properly considered possibly leading to an inaccurate model.

SUMMARY

In an example embodiment, a non-transitory computer-readable medium is provided having stored thereon computer-readable instructions that, when executed by a computing device, cause the computing device to select a trained spatial regression model. A spatial weights matrix defined for a plurality of observation vectors is selected. The spatial weights matrix has a dimension of N×N, where N is a number of the plurality of observation vectors. Each element of the spatial weights matrix indicates an amount of influence between respective pairs of observation vectors. Each observation vector of the plurality of observation vectors is spatially referenced. (A) A spatial regression model is selected from a plurality of spatial regression models. (B) The selected spatial regression model is initialized. (C) The initialized spatial regression model is trained using the plurality of observation vectors and the selected spatial weights matrix to fit a response variable using a plurality of regressor variables. Each observation vector of the plurality of observation vectors includes a response value for the response variable and a regressor value for each regressor variable of the plurality of regressor variables. A fit criterion value is computed for the trained spatial regression model. (A) through (C) are repeated until each spatial regression model of the plurality of spatial regression models is selected in (A) once. A best spatial regression model is selected as the trained spatial regression model having an extremum value of the computed fit criterion value. The selected best spatial regression model is output.

In yet another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to select a trained spatial regression model.

In an example embodiment, a method of selecting a trained spatial regression model is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

A model selection application 122 provides an automated model selection process to identify a best spatial regression model for a given spatial weights matrix. Model selection application 122 further provides an automated selection process to identify a spatial weights matrix that best describes an underlying neighbor relationship for spatial units in input data 424 from among different spatial computation methods. Model selection application 122 can be applied in a distributed computing environment, for example, to support big data applications. Model selection application 122 is computationally efficient resulting in a much faster computation time than using current methods.

Figure 1:
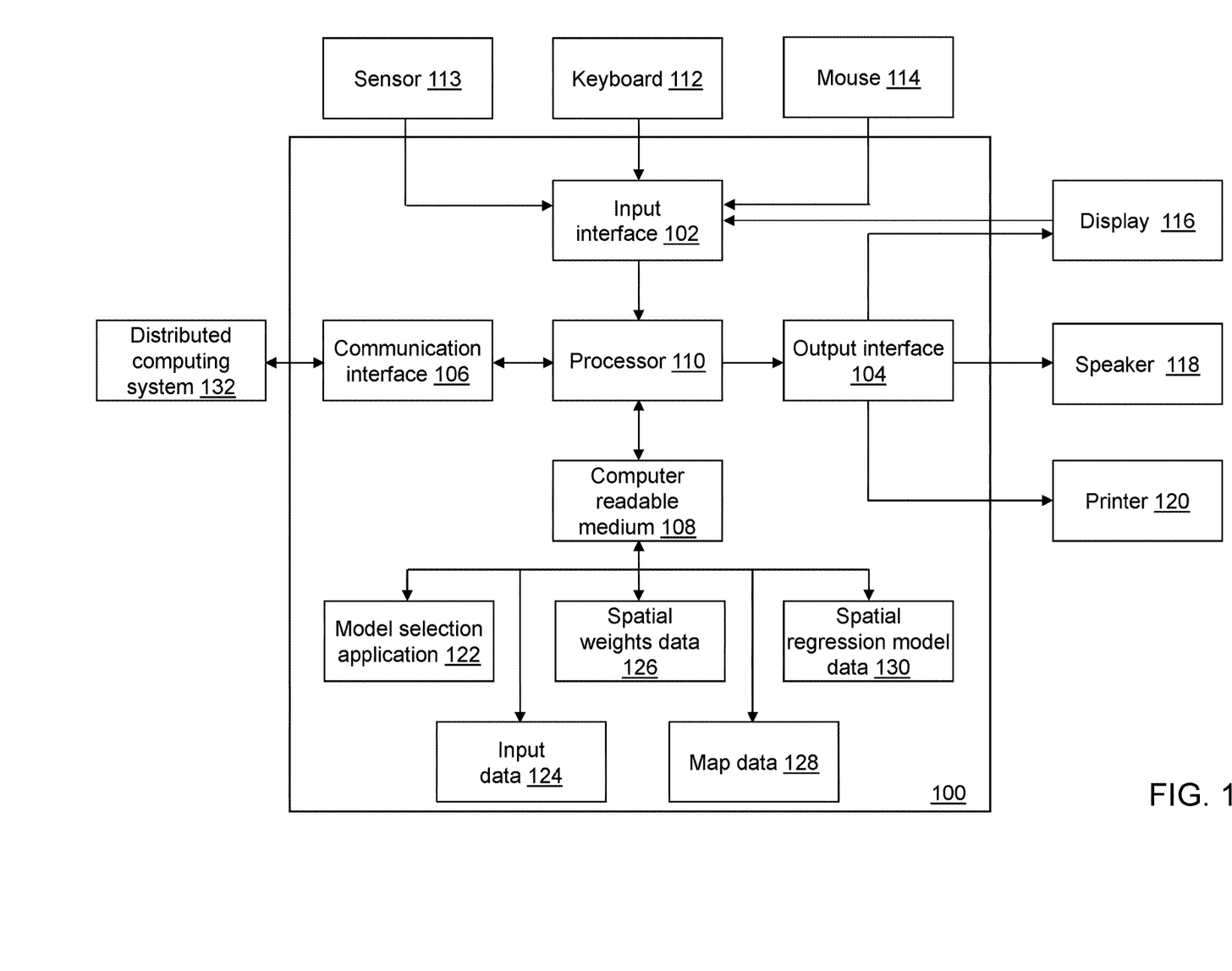
FIG. 1 depicts a block diagram of a model selection device in accordance with an illustrative embodiment.

Referring to FIG. 1, a block diagram of a model selection device 100 is shown in accordance with an illustrative embodiment. Model selection device 100 may include an input interface 102, an output interface 104, a communication interface 106, a non-transitory computer-readable medium 108, a processor 110, model selection application 122, input data 124, a spatial weights data 126, map data 128, and a spatial regression model data 130. Model selection application 122 trains a spatial regression model using input data 124, spatial weights data 126, and/or map data 128. Fewer, different, and/or additional components may be incorporated into model selection device 100.

Input interface 102 provides an interface for receiving information from the user or another device for entry into model selection device 100 as understood by those skilled in the art. Input interface 102 may interface with various input technologies including, but not limited to, a keyboard 112, a sensor 113, a mouse 114, a display 116, a track ball, a keypad, one or more buttons, etc. to allow the user to enter information into model selection device 100 or to make selections presented in a user interface displayed on display 116.

The same interface may support both input interface 102 and output interface 104. For example, display 116 comprising a touch screen provides a mechanism for user input and for presentation of output to the user. Model selection device 100 may have one or more input interfaces that use the same or a different input interface technology. The input interface technology further may be accessible by model selection device 100 through communication interface 106.

Output interface 104 provides an interface for outputting information for review by a user of model selection device 100 and/or for use by another application or device. For example, output interface 104 may interface with various output technologies including, but not limited to, display 116, a speaker 118, a printer 120, etc. Model selection device 100 may have one or more output interfaces that use the same or a different output interface technology. The output interface technology further may be accessible by model selection device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Model selection device 100 may have one or more communication interfaces that use the same or a different communication interface technology. For example, model selection device 100 may support communication using an Ethernet port, a Bluetooth antenna, a telephone jack, a USB port, etc. Data and/or messages may be transferred between model selection device 100 and another computing device of a distributed computing system 132 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Model selection device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Model selection device 100 also may have one or more drives that support the loading of a memory media such as a CD, DVD, an external hard drive, etc. One or more external hard drives further may be connected to model selection device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Model selection device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Figure 4:
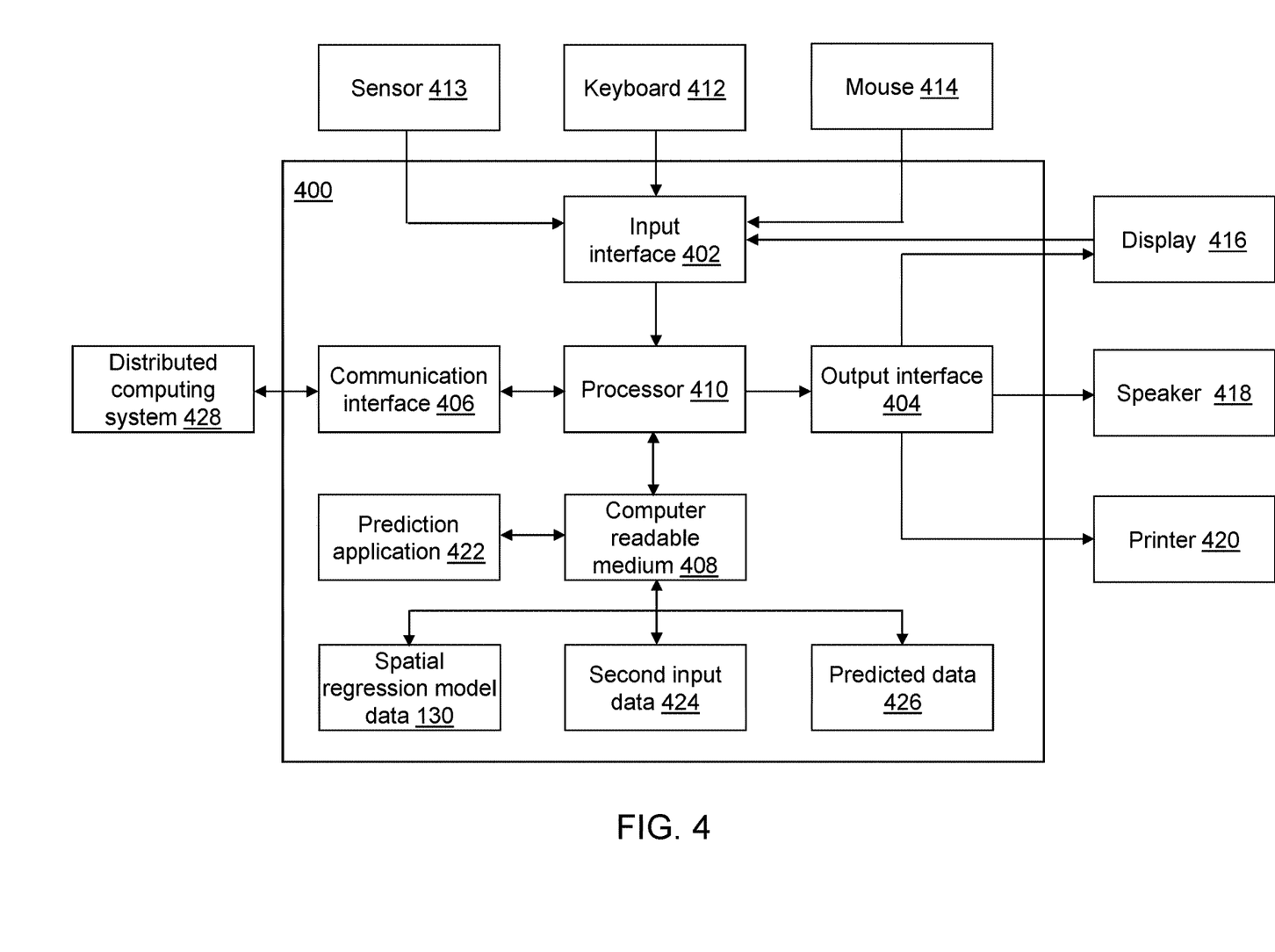
FIG. 4 depicts a block diagram of a prediction device in accordance with an illustrative embodiment.

Model selection application 122 may perform operations associated with selecting a trained spatial regression model to predict a response, for example, from data stored in second input data 424 (shown referring to FIG. 4). Model selection application 122 may further perform operations associated with hypothesis testing, drawings inferences, visualizing spatial data, etc. Some or all of the operations described herein may be embodied in model selection application 122. The operations may be implemented using hardware, firmware, software, or any combination of these methods.

Referring to the example embodiment of FIG. 1, model selection application 122 is implemented in software (comprised of computer-readable and/or computer-executable instructions) stored in computer-readable medium 108 and accessible by processor 110 for execution of the instructions that embody the operations of model selection application 122. Model selection application 122 may be written using one or more programming languages, assembly languages, scripting languages, etc. Model selection application 122 may be integrated with other analytic tools. As an example, model selection application 122 may be part of an integrated data analytics software application and/or software architecture such as that offered by SAS Institute Inc. of Cary, N.C., USA. Merely for illustration, model selection application 122 may be implemented using or integrated with one or more SAS software tools such as Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS® Econometrics, and SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Model selection application 122 may be implemented as a Web application. For example, model selection application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input data 124 may include, for example, a plurality of rows and a plurality of columns. The plurality of rows may be referred to as observation vectors or records (observations), and the columns may be referred to as variables. In an alternative embodiment, input data 124 may be transposed. The plurality of variables defines a vector $x_i$ for each observation vector i=1, 2, ..., N, where N is a number of the observation vectors included in input data 124.

The plurality of variables that define the vector $x_i$ for each observation vector includes a response variable that defines a response variable value $y_i$ for each observation vector that may indicate a characteristic defined for a respective observation vector $x_i$ for i=1, 2, ..., N. The plurality of variables that define the vector $x_i$ for each observation vector includes one or more regressor variables that define one or more regressor values $r_i$ for each observation vector. The plurality of variables that define the vector $x_i$ for each observation vector may include one or more spatial effect regressor variables that define one or more spatial effect regressor values $e_i$ for each observation vector. The plurality of variables that define the vector $x_i$ for each observation vector includes a spatial identifier (ID) variable that defines a spatial unit $s_i$ for each observation vector. The spatial unit $s_i$ is further used to associate entries in the spatial weights matrix with the observation vectors in input data 124. For example, each spatial unit may be associated with a different latitude and longitude location or other descriptor that indicates a spatial relationship. The spatial relationship need not be related to a physical location. The plurality of variables that define the vector $x_i$ for each observation vector may include a group variable that defines a group variable value $g_i$ for each observation vector. Observation vectors having a common value for the group variable value $g_i$ are included in a common group for spatial analysis purposes.

Input data 124 may include additional variables that are not included in the plurality of variables. One or more variables of the plurality of variables such as the one or more regressor variables and/or the one or more spatial effect regressor variables may describe a characteristic of a physical object. For example, if input data 124 include data related to operation of a vehicle, the variables may include a type of vehicle, an oil pressure, a speed, a gear indicator, a gas tank level, a tire pressure for each tire, an engine temperature, a radiator level, etc.

Sensor 113 may measure a physical quantity in an environment to which sensor 113 is associated and generate a corresponding measurement datum that may be associated with a time that the measurement datum is generated. The measurement datum may be stored in input data 124. Illustrative sensors include a pressure sensor, a temperature sensor, a position or location sensor, a voltage sensor, a current sensor, a frequency sensor, a humidity sensor, a dewpoint sensor, etc. that may be mounted to various components used as part of a system.

Input data 124 may include data captured as a function of time for one or more physical objects. The data stored in input data 124 may be captured at different time points, periodically, intermittently, when an event occurs, etc. Input data 124 may include data captured at a high data rate such as 200 or more observation vectors per second for one or more physical objects. One or more columns of input data 124 may include a time and/or date value. Input data 124 may include data captured under normal and abnormal operating conditions of the physical object.

The data stored in input data 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in input data 124 may be generated as part of the Internet of Things (IoT), where things (e.g., machines, devices, phones, sensors) can be connected to networks and the data from these things collected and processed within the things and/or external to the things before being stored in input data 124. For example, the IoT can include sensors in many different devices and types of devices, and high value analytics can be applied to identify hidden relationships and drive increased efficiencies. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input data 124.

The data stored in input data 124 may include any type of content represented in any computer-readable format such as binary, alphanumeric, numeric, string, markup language, etc. The content may include textual information, numeric information, etc. that further may be encoded using various encoding techniques as understood by a person of skill in the art.

Input data 124 may be stored on computer-readable medium 108 or on one or more computer-readable media of distributed computing system 132 and accessed by model selection device 100 using communication interface 106 and/or input interface 102. Input data 124 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input data 124 may be stored using various data structures as known to those skilled in the art including one or more files of a file system, a relational database, one or more tables of a system of tables, a structured query language database, etc. on model selection device 100 or on distributed computing system 132.

Model selection device 100 may coordinate access to input data 124 that is distributed across distributed computing system 132 that may include one or more computing devices. For example, input data 124 may be stored in a cube distributed across a grid of computers as understood by a person of skill in the art. As another example, input data 124 may be stored in a multi-node Hadoop® class. For instance, Apache™ Hadoop® is an open-source software framework for distributed computing supported by the Apache Software Foundation. As another example, input data 124 may be stored in a cloud of computers and accessed using cloud computing technologies, as understood by a person of skill in the art. The SAS® LASR™ Analytic Server may be used as an analytic platform to enable multiple users to concurrently access data stored in input data 124. The SAS Viya open, cloud-ready, in-memory architecture also may be used as an analytic platform to enable multiple users to concurrently access data stored in input data 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2A:
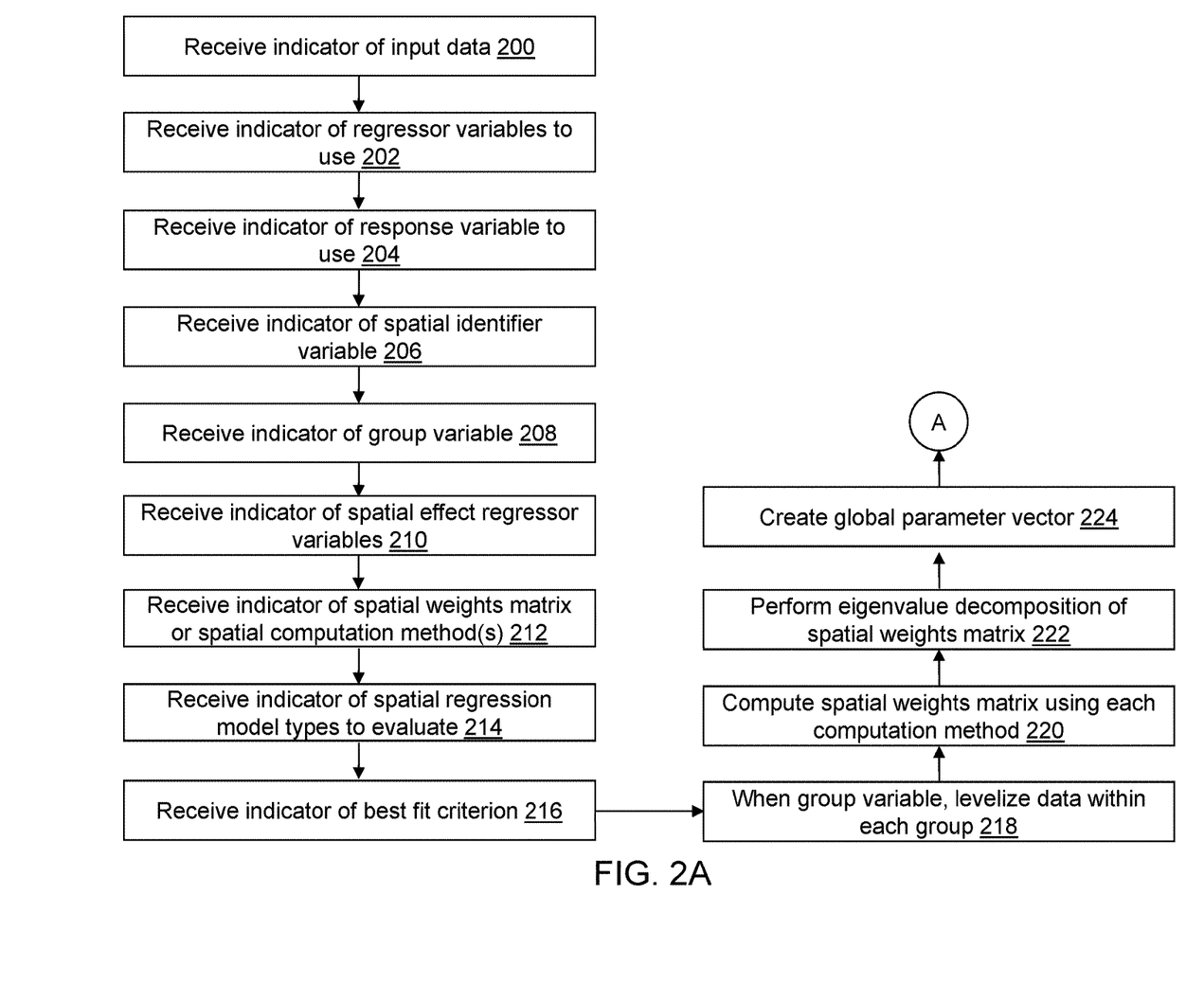
FIGS. 2A and 2B depict a flow diagram illustrating examples of operations performed by a model selection application of the model selection device of FIG. 1 in accordance with an illustrative embodiment.
Figure 2B:
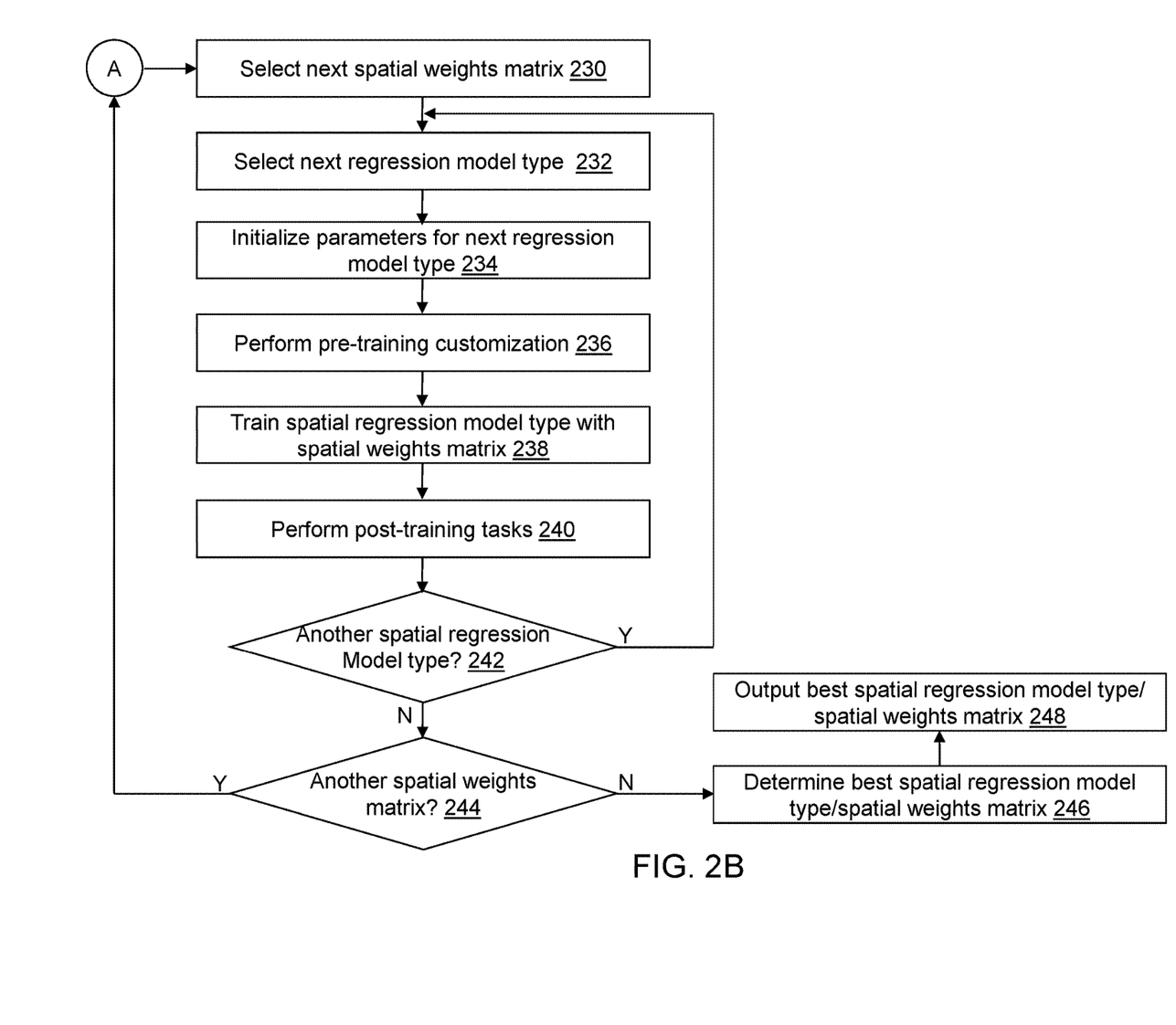

Referring to FIGS. 2A and 2B, example operations associated with model selection application 122 are described. Additional, fewer, or different operations may be performed depending on the embodiment of model selection application 122. The order of presentation of the operations of FIGS. 2A and 2B is not intended to be limiting. Some of the operations may not be performed in some embodiments. Although some of the operational flows are presented in sequence, the various operations may be performed in various repetitions and/or in other orders than those that are illustrated. For example, a user may execute model selection application 122, which causes presentation of a first user interface window, which may include a plurality of menus and selectors such as drop-down menus, buttons, text boxes, hyperlinks, etc. associated with model selection application 122 as understood by a person of skill in the art. The plurality of menus and selectors may be accessed in various orders. An indicator may indicate one or more user selections from a user interface, one or more data entries into a data field of the user interface, one or more data items read from a command line, one or more data items read from computer-readable medium 108, or one or more data items otherwise defined with one or more default values, etc. that are received as an input by model selection application 122. Some of the operational flows further may be performed in parallel, for example, using a plurality of threads and/or a plurality of computing devices such as may be included in distributed computing system 132.

Referring to FIG. 2A, in an operation 200, a first indicator may be received that indicates input data 124. For example, the first indicator indicates a location and a name of input data 124. As an example, the first indicator may be received by model selection application 122 after selection from a user interface window or after entry by a user into a user interface window. In an alternative embodiment, input data 124 may not be selectable. For example, a most recently created dataset may be used automatically.

In an operation 202, a second indicator may be received that indicates the one or more regressor variables to use from input data 124. For example, the second indicator may indicate one or more column numbers or one or more column names. The one or more regressor variables are the variables that define each regression vector $r_i$, where $r_i = r_{i,j}$, $j=1, \ldots, N_r$, $i=1, \ldots, N$. $r_{i,j}$ is a $j^{th}$ regressor variable value for the $i^{th}$ regression vector $r_i$. A number of the one or more regressor variables may be indicated by $N_r$.

In an operation 204, a third indicator may be received that indicates the response variable to use from input data 124. For example, the third indicator may indicate a column number or column name. The response variable defines the response variable value $y_i$ for each observation vector.

In an operation 206, a fourth indicator may be received that indicates the spatial ID variable to use from input data 124. For example, the fourth indicator may indicate a column number or column name. The spatial ID variable defines the spatial ID variable value $s_i$ for each observation vector such as a city name, a county name, a state name, a country name, a census tract identifier, a latitude/longitude pair, etc. Any of the city name, county name, state name, country name, census tract identifier, etc. may be referred to as a geographic entity identifier.

In an operation 208, a fifth indicator may be received that indicates the group variable to use from input data 124, if any. For example, the fifth indicator may indicate a column number or column name. The group variable defines the group variable value $g_i$ for each observation vector.

In an operation 210, a sixth indicator may be received that indicates the one or more spatial effect regressor variables to use from input data 124, if any. For example, the sixth indicator may indicate one or more column numbers or one or more column names. The one or more spatial effect regressor variables are the variables that define each spatial effect regression vector $e_i$, where $e_i = e_{i,j}$, $j=1, \ldots, N_e$, $i=1, \ldots, N$. $e_{i,j}$ is a $j^{th}$ spatial effect regressor variable value for the $i^{th}$ spatial effect regression vector $e_i$. A number of the one or more spatial effect regressor variables may be indicated by $N_e$.

In an operation 212, a seventh indicator may be received that indicates spatial weights data 126 or one or more spatial computation methods used to compute one or more corresponding spatial weights data 126 for evaluation. For example, the seventh indicator indicates a location and a name of spatial weights data 126. As an example, the seventh indicator may be received by model selection application 122 after selection from a user interface window or after entry by a user into a user interface window.

When spatial weights data 126 is not indicated using the seventh indicator, the one or more spatial computation methods may be indicated using the seventh indicator. The one or more spatial computation methods define how spatial weights data 126 is computed. For example, the seventh indicator may indicate one or more spatial computation functions to use with associated hyperparameters. For example, the seventh indicator indicates one or more names of a type of spatial computation function with associated hyperparameter(s). A default value or values for the one or more spatial computation functions may further be stored, for example, in computer-readable medium 108. As an example, a type of spatial computation function may be selected from "k-order binary contiguity", "k-nearest neighbors", etc. Additional illustrative spatial computation functions are described in a paper by Luisa Corrado and Bernard Fingleton, *Where is the economics in spatial econometrics*, Journal of Regional Science, 52(2): 210-239 (2012). Of course, the spatial computation function may be labeled or selected in a variety of different manners by the user as understood by a person of skill in the art. In an alternative embodiment, the spatial computation function may not be selectable, and a single spatial computation function is implemented in model selection application 122. For example, k-order binary contiguity may be used by default or without allowing a selection. With the indication of each spatial computation function, hyperparameters associated with the respective spatial computation function may be provided using the seventh indicator.

For illustration, the k-order binary contiguity spatial computation function is described on pages 486-487 of SAS® Econometrics 8.4 Econometrics Procedures published by SAS Institute Inc. 2019 (*Econometrics* 2019). For the k-order binary contiguity spatial computation function, the hyperparameters include an indicator of map data 128 that includes a spatial contiguity matrix from which k-order binary contiguity matrices may be determined, and a value for k that may default to one if not otherwise indicated. Spatial weights data 126 is defined from the spatial contiguity matrix included in map data 128 by row-standardizing the spatial contiguity matrix. The k-order binary contiguity spatial computation function may be indicated multiple times by the seventh indicator with different hyperparameters such as a different value of k or different map data 128. Map data 128 can include shapefiles, network graphs that describe how spatial units are connected, data with attributes that can be used as neighbor criteria to define a "neighbor" relationship between spatial units, etc.

For illustration, the k-nearest neighbors spatial computation function is described on page 487 of *Econometrics* 2019. For the k-nearest neighbors spatial computation function, the hyperparameters include an indicator of a distance function and/or a threshold distance value to identify two spatial units as neighbors. As an example, a distance function may be selected from "Euclidean", "Kullback-Leibler", "Manhattan", "Minkowski", "Cosine", "ChebysheV", "Hamming", etc. As an example, a default distance function may be "Euclidean" if one is not indicated. Of course, the distance function may be labeled or selected in a variety of different manners by the user as understood by a person of skill in the art. In an alternative embodiment, the distance function may not be selectable, and a single distance function is implemented by model selection application 122. The k-nearest neighbors spatial computation function may be indicated multiple times by the seventh indicator with different hyperparameters such as a different distance function or a different threshold distance value.

In an operation 214, an eighth indicator may be received that indicates one or more spatial regression model types to train to regress the response variable using the one or more regressor variables and, optionally, the one or more spatial effect regressor variables. As an example, a spatial regression model type may be selected from "Linear", "SLX", "SAR", "SDM", "SEM", "SDEM", "SMA", "SDMA", "SARMA", "SDARMA", "SAC", "SDAC", "CAR", "CAR2", etc. As an example, a default spatial regression model type may be "Linear" if one is not indicated. Of course, the spatial regression model type may be labeled or selected in a variety of different manners by the user as understood by a person of skill in the art. The eighth indicator may include a comma separated list of spatial regression model types to evaluate. As another option, the eighth indicator may include "ALL" to indicate that all of the defined spatial regression model types be trained and evaluated for accuracy.

For illustration, the "Linear", "SLX", "SAR", "SDM", "SEM", "SDEM", "SMA", "SDMA", "SARMA", "SDARMA", "SAC", and "SDAC" spatial regression model types are described on pages 477-486 of *Econometrics* 2019. For illustration, the "CAR" and "CAR2" spatial regression model type is described on page 590 of SAS® Econometrics Econometrics Procedures published by SAS Institute Inc. Apr. 21, 2021 (*Econometrics* 2021). Linear indicates a linear model type, SLX indicates a linear model with spatial lag of X model type, SAR indicates a spatial autoregressive model type, SDM indicates a spatial Durbin model type, SEM indicates a spatial error model type, SDEM indicates a spatial Durbin error model type, SMA indicates a spatial moving average model type, SDMA indicates a spatial Durbin moving average model type, SARMA indicates a spatial autoregressive moving average model type, SDARMA indicates a spatial Durbin autoregressive moving average model type, SAC indicates a spatial autoregressive confused model type, SDAC indicates a spatial Durbin autoregressive confused model type, CAR indicates a conditional autoregressive model type, and CAR2 indicates a second conditional autoregressive model type.

In an operation 216, a ninth indicator may be received that indicates a best fit criterion used to select a best spatial regression model. As an example, a best fit criterion may be selected from "AIC", "SBC", etc. As an example, a default best fit criterion may be "AIC" if one is not indicated. Of course, the best fit criterion may be labeled or selected in a variety of different manners by the user as understood by a person of skill in the art. For illustration, AIC indicates an Akaike information criterion, and SBC indicated a Schwarz's Bayesian information criterion. The best fit criterion indicates a type of fit statistic to compute for each trained spatial regression model and to use as the basis for selecting the best spatial regression model from among those indicated in operation 214. A smallest AIC value or SBC value may indicate the best spatial regression model.

In an operation 218, when a group variable is indicated in operation 208, the data read from input data 124 is levelized to associate values of a classification variable (i.e., a variable that lies on a nominal scale) with levels.

In an operation 220, a spatial weights matrix is computed for each spatial computation method with its associated hyperparameters indicated in operation 212 when spatial weights data 126 is not indicated in operation 212. As a result, a plurality of spatial weights matrices $W_i$, i=1, . . . , $N_{sw}$ may be defined, where $N_{sw}$ is a number of the one or more spatial weights matrices computed. When spatial weights data 126 is indicated in operation 212, $N_{sw}$ may be one, and $W_1$ is defined by reading from spatial weights data 126. Optionally, each of the one or more spatial weights matrices may be normalized and/or made symmetric. Additionally, column names read from spatial weights data 126 or map data 128 may be used to determine the ordering of the spatial units, and the row names may be matched to the column names. The matching assigns entries in each spatial weights matrix $W_i$ the correct indices. When the k-nearest neighbors spatial computation function is selected as the spatial computation function, the row and column names may be defined based on the spatial ID variable read from input data 124 and used in the distance computed between each pair of observation vectors.

In an operation 222, an eigenvalue decomposition of each spatial weights matrix $W_i$, i=1, . . . , $N_{sw}$ is performed to compute minimum and maximum real eigenvalues of each spatial weights matrix $W_i$. The minimum and maximum real eigenvalues of each spatial weights matrix $W_i$ are used to determine a domain of a first spatial coefficient ρ and/or a second spatial coefficient λ for each spatial regression model type indicated in operation 214.

In an operation 224, a global parameter vector is defined from the parameters defined for each spatial regression model type indicated in operation 214, and processing continues in operation 230 shown referring to FIG. 2B. A vector of model parameters varies for each spatial regression model type. The global parameter vector is defined for a most complicated spatial regression model type indicated in operation 214 instead of creating a model specific parameter vector for each spatial regression model type indicated in operation 214. For example, a most complicated spatial regression model type includes the most parameters for inclusion in the global parameter vector. The parameters associated with each of the illustrative spatial regression model types above are listed in Table 1 below in order of complexity resulting in $g_p=(\beta, \gamma, \rho, \lambda, \sigma^2)$, where $g_p$ is the global parameter vector, $\beta$ indicates a vector of regression coefficients for non-spatial regressors, $\gamma$ indicates a vector of regressor coefficients for spatial effect regressors, and $\sigma^2$ indicates a variance value.

TABLE 1

| Model type | Parameters |
| --- | --- |
| SDAC | $(\beta, \gamma, \rho, \lambda, \sigma^2)$ |
| SDARMA | $(\beta, \gamma, \rho, \lambda, \sigma^2)$ |
| SDM | $(\beta, \gamma, \rho, \sigma^2)$ |
| SDEM | $(\beta, \gamma, \lambda, \sigma^2)$ |
| SDMA | $(\beta, \gamma, \lambda, \sigma^2)$ |
| CAR2 | $(\beta, \gamma, \rho, \sigma^2)$ |
| SAC | $(\beta, \rho, \lambda, \sigma^2)$ |
| SARMA | $(\beta, \rho, \lambda, \sigma^2)$ |
| SLX | $(\beta, \gamma, \sigma^2)$ |
| SAR | $(\beta, \rho, \sigma^2)$ |
| SEM | $(\beta, \lambda, \sigma^2)$ |
| SMA | $(\beta, \lambda, \sigma^2)$ |
| CAR | $(\beta, \rho, \sigma^2)$ |
| Linear | $(\beta, \sigma^2)$ |

The values for $\beta, \gamma, \rho, \lambda, \sigma^2$ may not be the same for each spatial regression model type. The memory allocated for the global parameter vector is reused though so that a model specific parameter vector is not created for each spatial regression model type.

Referring to FIG. 2B, in operation 230, a next spatial weights matrix $W_i$, i=1, ..., $N_{sw}$ is selected. For example, on a first iteration of operation 230, $W_1$ may be selected; on a second iteration of operation 230, $W_2$ may be selected; and so on until each spatial weights matrix $W_i$, i=1, ..., $N_{sw}$ is selected once.

In an operation 232, a next spatial regression model type is selected. For example, on a first iteration of operation 232 immediately following operation 230, a first spatial regression model type indicated in operation 214 may be selected; on a second iteration of operation 232 immediately following operation 230, first spatial regression model type indicated in operation 214 may be selected; and so on until each spatial regression model type is selected once. When another spatial regression model type loop is initiated by a next iteration of operation 230, the next spatial regression model type is again the first spatial regression model type indicated in operation 214 on a first iteration of operation 232 immediately following operation 230. As a result, each spatial regression model type is executed with each spatial weights matrix $W_i$, i=1, ..., $N_{sw}$.

In an operation 234, the selected next regression model type is initialized as needed. For example, a parameter vector for the selected next spatial regression model type is initialized from the global parameter vector $g_p$ and a domain for the spatial coefficients is defined.

In an operation 236, pre-training customization is performed for the selected next regression model type as needed.

In an operation 238, the selected next regression model type is trained with the selected spatial weights matrix $W_i$ using the regressor variables indicated in operation 202 and the spatial effect regressor variables indicated in operation 210, if any, to estimate response variable values for the response variable. Regressor variable values and, optionally, spatial effect regressor variable values are read from input data 124 and matched to entries in the selected spatial weights matrix $W_i$ using the spatial ID variable associated with each observation vector. A fit criterion value is computed for the trained regression model based on the best fit criterion indicated in operation 216. The fit criterion value is a measure of accuracy between the estimated response variable value for each observation vector relative to the response variable value read from input data 124 for each respective observation vector.

In an operation 240, any post-training tasks such as the computation of test statistics for a user-specified hypothesis test, impact estimate, output, etc. are performed for the selected next regression model type as needed.

In an operation 242, a determination is made concerning whether there is another spatial regression model type indicated in operation 214 that has not been processed since a most iteration of operation 230. When there is another spatial regression model type to process, processing continues in operation 232 to select the next spatial regression model type. When there is not another spatial regression model type to process, processing continues in an operation 244.

In operation 244, a determination is made concerning whether there is another spatial weights matrix $W_i$ that has not been selected in operation 230. When there is another spatial weights matrix $W_i$ to process, processing continues in operation 230 to select the next weights matrix $W_i$. When there is not another spatial weights matrix $W_i$ to process, processing continues in an operation 246.

In operation 246, the best spatial regression model type is selected from all of the spatial regression model types trained in operation 238 based on an extremum value of the fit criterion value computed for the combination of each spatial weights matrix $W_i$ with each spatial regression model type. For example, a minimum fit criterion value may be identified and the best spatial weights matrix $W_i$ and the best spatial regression model type are selected that resulted in the minimum fit criterion value. Depending on the best fit criterion, a maximum value may indicate the best combination.

In an operation 248, the best spatial weights matrix $W_i$ and the best spatial regression model type may be output. For example, the parameters estimated for the selected best spatial regression model type may be output to spatial regression model data 130. The best spatial weights matrix $W_i$ may be output to spatial weights data 126. Additional, information may further be output. For example, the fit criterion value may be output for each combination of the spatial weights matrix $W_i$ and the spatial regression model type. As another example, the best spatial regression model type trained using each spatial weights matrix $W_i$ may be determined and output.

Figure 3:
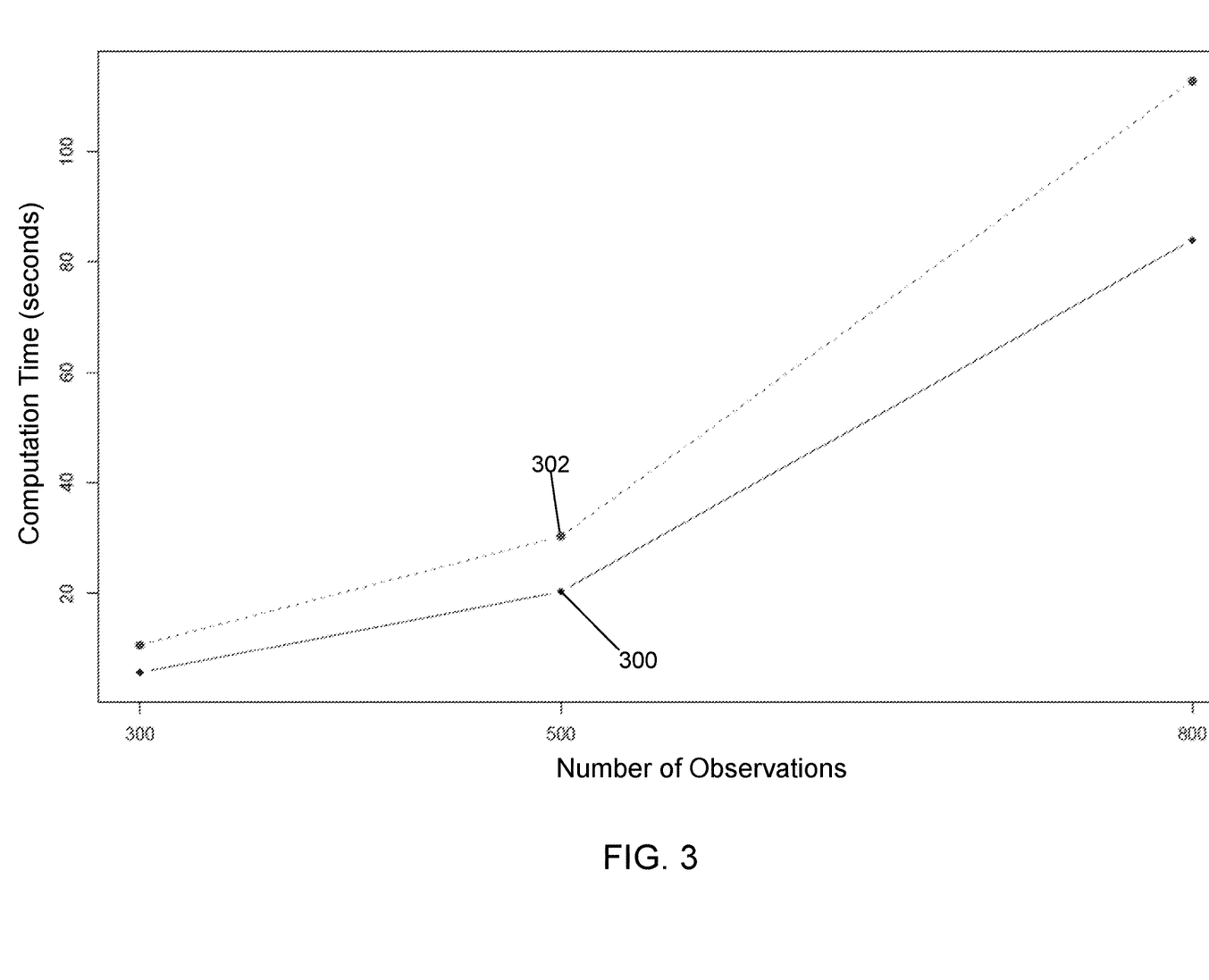
FIG. 3 shows a computation time comparison between the model selection application and an existing method in accordance with an illustrative embodiment.

A performance of model selection application 122 was compared to an existing method that trains each spatial regression model type separately. Three different values for the number of the observation vectors N were executed, N=300, N=500, and N=800. For each value of N, five datasets were simulated from a SAR model defined by $y=\rho Wy+X\beta+\varepsilon$. In particular, the true values for $\rho=0.6$ and for $\beta=(1.8, 0.9,-1.2)$. In addition to the intercept term, two covariates $x_1$ and $x_2$ were simulated from a standard normal distribution. The error terms E were simulated from a normal distribution with a mean value of zero and $\sigma^2=0.1$. For each of the five datasets, a computation time using model selection application 122 with the spatial regression model types SDAC, SDARMA, SDM, SDEM, SDMA, CAR2, SLX, SAC, SARMA, SAR, SEM, SMA, CAR, and Linear, separately and using the existing method that separately executed each spatial regression model type was captured. For each value of the number of the observation vectors N, the average computation time across the five datasets was computed.

Referring to FIG. 3, a first curve 300 shows the computation time in seconds as a function of the number of observation vectors N using model selection application 122, and a second curve 302 shows the computation time in seconds as a function of the number of observation vectors using the existing method. Model selection application 122 provides a faster computation time relative to the existing method and the difference in the computation time increases with the number of observation vectors. The user time to train each spatial regression model type separately is further reduced significantly because the processing is performed automatically for each indicated spatial regression model type.

Referring to FIG. 4, a block diagram of a prediction device 400 is shown in accordance with an illustrative embodiment. Prediction device 400 may include a second input interface 402, a second output interface 404, a second communication interface 406, a second non-transitory computer-readable medium 408, a second processor 410, a prediction application 422, second input data 424, spatial regression model data 130, and predicted data 426. Fewer, different, and/or additional components may be incorporated into prediction device 400. Prediction device 400 and model selection device 100 may be the same or different devices.

Second input interface 402 provides the same or similar functionality as that described with reference to input interface 102 of model selection device 100 though referring to prediction device 400. Second output interface 404 provides the same or similar functionality as that described with reference to output interface 104 of model selection device 100 though referring to prediction device 400. Second communication interface 406 provides the same or similar functionality as that described with reference to communication interface 106 of model selection device 100 though referring to prediction device 400. Data and messages may be transferred between prediction device 400 and a distributed computing system 428 using second communication interface 406. Distributed computing system 132 and distributed computing system 428 may be the same or different computing systems. Second computer-readable medium 408 provides the same or similar functionality as that described with reference to computer-readable medium 108 of model selection device 100 though referring to prediction device 400. Second processor 410 provides the same or similar functionality as that described with reference to processor 110 of model selection device 100 though referring to prediction device 400.

Prediction application 422 performs operations associated with generating data stored in second input data 424 using the spatial regression model description stored in spatial regression model data 130 and the spatial weights matrix stored in spatial weights data 126. Some or all of the operations described herein may be embodied in prediction application 422. The operations may be implemented using hardware, firmware, software, or any combination of these methods.

Referring to the example embodiment of FIG. 4, prediction application 422 is implemented in software (comprised of computer-readable and/or computer-executable instructions) stored in second computer-readable medium 408 and accessible by second processor 410 for execution of the instructions that embody the operations of prediction application 422. Prediction application 422 may be written using one or more programming languages, assembly languages, scripting languages, etc. Similar to model selection application 122, prediction application 422 may be integrated with other analytic tools. Prediction application 422 and model selection application 122 may be the same or different applications that are integrated in various manners to generate synthetic data for use in training a machine learning model. Prediction application 422 may be implemented as a Web application.

Input data 124 and second input data 424 may be generated, stored, and accessed using the same or different mechanisms. Similar to input data 124, second input data 424 may include a plurality of rows and a plurality of columns with the plurality of rows referred to as observations or records, and the columns referred to as variables that are associated with an observation. Second input data 424 may be transposed.

Similar to input data 124, second input data 424 may be stored on second computer-readable medium 408 or on one or more computer-readable media of distributed computing system 428 and accessed by prediction device 400 using second communication interface 406. Data stored in second input data 424 may be a sensor measurement or a data communication value, for example, from a sensor 413, may be generated or captured in response to occurrence of an event or a transaction, generated by a device such as in response to an interaction by a user with the device, for example, from a second keyboard 412 or a second mouse 414, etc. The data stored in second input data 424 may include any type of content represented in any computer-readable format such as binary, alphanumeric, numeric, string, markup language, etc. The content may include textual information, numeric information, etc. that further may be encoded using various encoding techniques as understood by a person of skill in the art. The data stored in second input data 424 may be captured at different time points, periodically, intermittently, when an event occurs, etc. One or more columns may include a time value. Similar to input data 124, data stored in second input data 424 may be generated as part of the IoT, and some or all data may be pre- or post-processed by an ESPE.

Similar to input data 124, second input data 424 may be stored in various compressed formats such as a coordinate format, a compressed sparse column format, a compressed sparse row format, etc. Second input data 424 further may be stored using various structures as known to those skilled in the art including a file system, a relational database, a system of tables, a structured query language database, etc. on prediction device 400 and/or on distributed computing system 428. Prediction device 400 may coordinate access to second input data 424 that is distributed across a plurality of computing devices that make up distributed computing system 428. For example, second input data 424 may be stored in a cube distributed across a grid of computers as understood by a person of skill in the art. As another example, second input data 424 may be stored in a multi-node Hadoop® cluster. As another example, second input data 424 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second input data 424.

Figure 5:
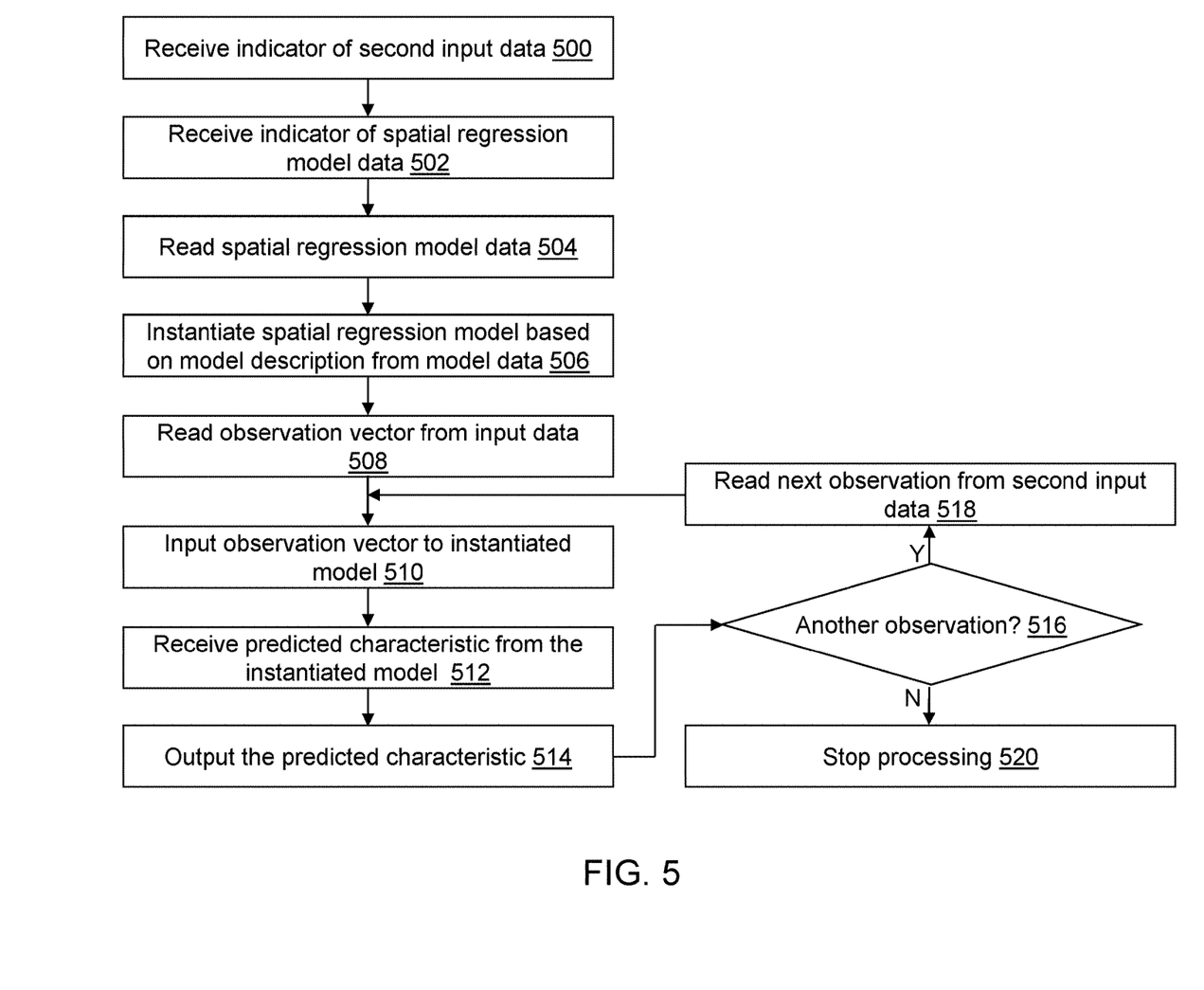
FIG. 5 depicts a flow diagram illustrating examples of operations performed by a prediction application of the prediction device of FIG. 4 in accordance with an illustrative embodiment.

Referring to FIG. 5, example operations of prediction application 422 are described to predict response variable values for observation vectors read from second input data 424. Additional, fewer, or different operations may be performed depending on the embodiment of prediction application 422. The order of presentation of the operations of FIG. 5 is not intended to be limiting. Although some of the operational flows are presented in sequence, the various operations may be performed in various repetitions, concurrently (in parallel, for example, using threads and/or distributed computing system 428), and/or in other orders than those that are illustrated.

In an operation 500, a tenth indicator may be received that indicates second input data 426. For example, the tenth indicator indicates a location and a name of second input data 426. As an example, the tenth indicator may be received by prediction application 422 after selection from a user interface window or after entry by a user into a user interface window. In an alternative embodiment, second input data 426 may not be selectable. For example, a most recently created dataset may be used automatically.

In an operation 502, an eleventh indicator may be received that indicates spatial regression model data 130. For example, the eleventh indicator indicates a location and a name of spatial regression model data 130. As an example, the eleventh indicator may be received by prediction application 422 after selection from a user interface window or after entry by a user into a user interface window. In an alternative embodiment, spatial regression model data 130 may not be selectable. For example, a most recently created model configuration may be used automatically. As another example, spatial regression model data 130 may be provided automatically as part of integration with model selection application 122.

In an operation 504, a best spatial regression model description may be read from spatial regression model data 130.

In an operation 506, a spatial regression model is instantiated with the best spatial regression model description. For example, the parameters that describe the best spatial regression model output from the selection process in operation 248 may be used to instantiate the spatial regression model.

In an operation 508, an observation vector is read from second input data 424.

In an operation 510, the observation vector is input to the instantiated spatial regression model to predict a response variable value for the observation vector.

In an operation 512, a predicted response variable value for the read observation vector is received as an output of the instantiated model.

In an operation 514, the predicted response variable value may be output, for example, by storing the predicted response variable value with the observation vector to predicted data 426. In addition, or in the alternative, the predicted response variable value may be presented on a second display 416, printed on a second printer 420, sent to another computing device using second communication interface 406, an alarm or other alert signal may be sounded through a second speaker 418, etc.

In an operation 516, a determination is made concerning whether or not second input data 424 includes another observation vector. When second input data 424 includes another observation vector, processing continues in an operation 518. When second input data 424 does not include another observation vector, processing continues in an operation 520.

In operation 518, a next observation vector is read from second input data 424, and processing continues in operation 510.

In operation 520, processing stops and cleanup is performed as needed.

The instantiated spatial regression model may further be used to evaluate a hypothesis. For example, an indicator of the hypothesis may be received and provided as an input to the instantiated spatial regression model to predict whether the hypothesis is true or false. A hypothesis test that may be selected by a user may be performed with the instantiated spatial regression model and a result of the hypothesis test may be output, for example, to predicted data 426 with the received hypothesis.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   (A) select a spatial weights matrix defined for a plurality of observation vectors, wherein the spatial weights matrix has a dimension of N×N, where N is a number of the plurality of observation vectors, wherein each element of the spatial weights matrix indicates an amount of influence between respective pairs of observation vectors, wherein each observation vector of the plurality of observation vectors is spatially referenced;
   (B) select a spatial regression model from a plurality of spatial regression models;
   (C) initialize the selected spatial regression model;
   (D) train the initialized spatial regression model using the plurality of observation vectors and the selected spatial weights matrix to fit a response variable using a plurality of regressor variables, wherein each observation vector of the plurality of observation vectors includes a response value for the response variable and a regressor value for each regressor variable of the plurality of regressor variables, wherein a fit criterion value is computed for the trained spatial regression model;

(E) repeat (B) through (D) until each spatial regression model of the plurality of spatial regression models is selected in (B) once;

(F) select a best spatial regression model as the trained spatial regression model having an extremum value of the computed fit criterion value; and (G) output the selected best spatial regression model.

2. The non-transitory computer-readable medium of claim 1, wherein the spatial weights matrix is selected from a single predefined spatial weights matrix.

3. The non-transitory computer-readable medium of claim 1, wherein the spatial weights matrix is selected from a single spatial weights matrix computed from predefined map data using a predefined spatial computation method.

4. The non-transitory computer-readable medium of claim 1, wherein the spatial weights matrix is selected from a plurality of computed spatial weights matrices.

5. The non-transitory computer-readable medium of claim 4, wherein each spatial weights matrix of the plurality of computed spatial weights matrices is computed from predefined map data using a plurality of spatial computation methods.

6. The non-transitory computer-readable medium of claim 5, wherein, before (A), the computer-readable instructions further cause the computing device to compute the plurality of computed spatial weights matrices from the predefined map data using the plurality of spatial computation methods.

7. The non-transitory computer-readable medium of claim 6, wherein, after (E) and before (F), the computer-readable instructions further cause the computing device to repeat (A) through (E) until each computed spatial weights matrix of the plurality of computed spatial weights matrices is selected in (A) once.

8. The non-transitory computer-readable medium of claim 7, wherein the computed spatial weights matrix associated with the selected best spatial regression model is further output in (G).

9. The non-transitory computer-readable medium of claim 1, wherein the initialized spatial regression model is further trained using a predefined spatial effect regressor, wherein each observation vector of the plurality of observation vectors further includes a spatial regressor value for the predefined spatial effect regressor.

10. The non-transitory computer-readable medium of claim 1, wherein the fit criterion value is selected from the group consisting of an Akaike's information criterion value and a Schwarz's Bayesian information criterion value.

11. The non-transitory computer-readable medium of claim 1, wherein the extremum value of the computed fit criterion value is a minimum value of the computed fit criterion value.

12. The non-transitory computer-readable medium of claim 1, wherein each spatial regression model of the plurality of spatial regression models has a predefined model type, wherein the predefined model type is selected from a linear model type, a linear model with spatial lag of X model type, a spatial autoregressive model type, a spatial Durbin model type, a spatial error model type, a spatial Durbin error model type, a spatial moving average model type, a spatial Durbin moving average model type, a spatial autoregressive moving average model type, a spatial Durbin autoregressive moving average model type, a spatial autoregressive confused model type, a spatial Durbin autoregressive confused model type, and a conditional autoregressive model type.

13. The non-transitory computer-readable medium of claim 12, wherein initializing the selected spatial regression model comprises defining initial values for parameters based on the predefined model type of the selected spatial regression model.

14. The non-transitory computer-readable medium of claim 13, wherein, before (B), the computer-readable instructions further cause the computing device to create a global parameter vector based on the parameters defined for the plurality of spatial regression models, wherein the initial values for the parameters are defined from the created global parameter vector.

15. The non-transitory computer-readable medium of claim 1, wherein, before (A), the computer-readable instructions further cause the computing device to perform an eigenvalue decomposition of the selected spatial weights matrix and to determine a parameter space of spatial coefficients using the eigenvalue decomposition, wherein the initialized spatial regression model is further trained based on the determined parameter space of the spatial coefficients.

16. The non-transitory computer-readable medium of claim 1, wherein each observation vector of the plurality of observation vectors further includes a group value for a group variable, wherein each observation vector of the plurality of observation vectors having a common value for the group value is assigned to a group of a plurality of groups, wherein, before (A), the computer-readable instructions further cause the computing device to levelize data within each group of the plurality of groups.

17. The non-transitory computer-readable medium of claim 16, wherein, before (A), the computer-readable instructions further cause the computing device to perform an eigenvalue decomposition of the selected spatial weights matrix and to determine a parameter space of spatial coefficients using the eigenvalue decomposition for each group of the plurality of groups, wherein the initialized spatial regression model is further trained based on the determined parameter space of the spatial coefficients for each group of the plurality of groups.

18. The non-transitory computer-readable medium of claim 1, wherein, before (A), the computer-readable instructions further cause the computing device to determine an ordering of spatial units that provide the spatial referencing based on column names of a predefined spatial weights matrix and to match row names of the predefined spatial weights matrix to define the spatial weights matrix.

19. The non-transitory computer-readable medium of claim 1, wherein each observation vector of the plurality of observation vectors includes a spatial identifier that provides the spatial reference, wherein each row of the predefined spatial weights matrix includes the spatial identifier for a single observation vector of the plurality of observation vectors.

20. The non-transitory computer-readable medium of claim 19, wherein each spatial identifier is associated with a latitude and a longitude.

21. The non-transitory computer-readable medium of claim 19, wherein each spatial identifier is associated with a geographic entity identifier.

22. The non-transitory computer-readable medium of claim 1, wherein, after (F), the computer-readable instructions further cause the computing device to:

read an observation vector from a dataset;

compute an expected response variable value of the read observation vector using the selected best spatial regression model; and output the computed expected response variable value of the read observation vector.

23. The non-transitory computer-readable medium of claim 1, wherein, after (F), the computer-readable instructions further cause the computing device to:
receive a hypothesis;
perform a hypothesis test using the received hypothesis with the selected best spatial regression model; and
output a result of the performed hypothesis test.

24. A computing device comprising:
a processor; and
a non-transitory computer-readable medium operably coupled to the processor, the computer-readable medium having computer-readable instructions stored thereon that, when executed by the processor, cause the computing device to
(A) select a spatial weights matrix defined for a plurality of observation vectors, wherein the spatial weights matrix has a dimension of N×N, where N is a number of the plurality of observation vectors, wherein each element of the spatial weights matrix indicates an amount of influence between respective pairs of observation vectors, wherein each observation vector of the plurality of observation vectors is spatially referenced;
(B) select a spatial regression model from a plurality of spatial regression models;
(C) initialize the selected spatial regression model;
(D) train the initialized spatial regression model using the plurality of observation vectors and the selected spatial weights matrix to fit a response variable using a plurality of regressor variables, wherein each observation vector of the plurality of observation vectors includes a response value for the response variable and a regressor value for each regressor variable of the plurality of regressor variables, wherein a fit criterion value is computed for the trained spatial regression model;
(E) repeat (B) through (D) until each spatial regression model of the plurality of spatial regression models is selected in (B) once;
(F) select a best spatial regression model as the trained spatial regression model having an extremum value of the computed fit criterion value; and
(G) output the selected best spatial regression model.

25. A method of selecting a trained spatial regression model, the method comprising:
(A) selecting, by a computing device, a spatial weights matrix defined for a plurality of observation vectors, wherein the spatial weights matrix has a dimension of N×N, where N is a number of the plurality of observation vectors, wherein each element of the spatial weights matrix indicates an amount of influence between respective pairs of observation vectors, wherein each observation vector of the plurality of observation vectors is spatially referenced;
(B) selecting, by the computing device, a spatial regression model from a plurality of spatial regression models;
(C) initializing, by the computing device, the selected spatial regression model;
(D) training, by the computing device, the initialized spatial regression model using the plurality of observation vectors and the selected spatial weights matrix to fit a response variable using a plurality of regressor variables, wherein each observation vector of the plurality of observation vectors includes a response value for the response variable and a regressor value for each regressor variable of the plurality of regressor variables, wherein a fit criterion value is computed for the trained spatial regression model;
(E) repeating, by the computing device, (B) through (D) until each spatial regression model of the plurality of spatial regression models is selected in (B) once;
(F) selecting, by the computing device, a best spatial regression model as the trained spatial regression model having an extremum value of the computed fit criterion value; and
(G) outputting, by the computing device, the selected best spatial regression model.

26. The method of claim 25, wherein the spatial weights matrix is selected from a plurality of computed spatial weights matrices.

27. The method of claim 26, wherein each spatial weights matrix of the plurality of computed spatial weights matrices is computed from predefined map data using a plurality of spatial computation methods.

28. The method of claim 27, further comprising, before (A), computing, by the computing device, the plurality of computed spatial weights matrices from the predefined map data using the plurality of spatial computation methods.

29. The method of claim 28, further comprising, after (E) and before (F), repeating, by the computing device, (A) through (E) until each computed spatial weights matrix of the plurality of computed spatial weights matrices is selected in (A) once.

30. The method of claim 25, further comprising, before (A), performing, by the computing device, an eigenvalue decomposition of the selected spatial weights matrix and to determine a parameter space of spatial coefficients using the eigenvalue decomposition, wherein the initialized spatial regression model is further trained based on the determined parameter space of the spatial coefficients.

* * * * *

UNITED STATES PATENT AND TRADEMARK OFFICE
CERTIFICATE OF CORRECTION

PATENT NO. : 11,328,225 B1  
APPLICATION NO. : 17/524406  
DATED : May 10, 2022  
INVENTOR(S) : Guohui Wu et al.

Page 1 of 1

It is certified that error appears in the above-identified patent and that said Letters Patent is hereby corrected as shown below:

In the Specification

Column 13, Line 5:
Delete the phrase "The error terms E were" and replace with --The error terms $\varepsilon$ were--.

Signed and Sealed this  
Eleventh Day of October, 2022

Katherine Kelly Vidal  
*Director of the United States Patent and Trademark Office*